(12) United States Patent
Silberman

(10) Patent No.: US 7,349,608 B2
(45) Date of Patent: Mar. 25, 2008

(54) STATIONERY PRODUCTS INCORPORATING FIBER OPTICS

(75) Inventor: Barry Silberman, Boca Raton, FL (US)

(73) Assignee: Inkology, Inc., Deerfield Beach, FL (US)

( * ) Notice: Subject to any disclaimer, the term of this patent is extended or adjusted under 35 U.S.C. 154(b) by 65 days.

(21) Appl. No.: 10/996,302

(22) Filed: Nov. 22, 2004

(65) Prior Publication Data

US 2005/0265654 A1    Dec. 1, 2005

Related U.S. Application Data

(60) Provisional application No. 60/534,174, filed on Dec. 31, 2003.

(51) Int. Cl.
*A47G 35/00* (2006.01)
*F21V 7/04* (2006.01)
*G02B 6/06* (2006.01)

(52) U.S. Cl. .................. 385/117; 362/565; 362/605

(58) Field of Classification Search .............. None
See application file for complete search history.

(56) References Cited

U.S. PATENT DOCUMENTS

| 4,559,583 | A | * | 12/1985 | Ku | 362/565 |
| 4,875,144 | A | | 10/1989 | Wainwright | 362/103 |
| 4,975,809 | A | * | 12/1990 | Ku | 362/605 |
| 6,151,439 | A | | 11/2000 | Wainwright | 385/147 |
| 6,198,872 | B1 | * | 3/2001 | Lipson et al. | 385/117 |
| 6,217,188 | B1 | | 4/2001 | Wainwright et al. | 362/103 |
| 6,302,570 | B1 | | 10/2001 | Petell et al. | 362/554 |
| 6,361,075 | B1 | | 3/2002 | Ritter et al. | 281/44 |
| 2002/0145280 | A1 | | 10/2002 | Bock | 281/15.1 |
| 2005/0036303 | A1 | * | 2/2005 | Yu et al. | 362/118 |
| 2005/0057941 | A1 | * | 3/2005 | Pederson et al. | 362/542 |

FOREIGN PATENT DOCUMENTS

| JP | 2002240489 A | 8/2002 |
| JP | 2003237292 A | 8/2003 |

* cited by examiner

*Primary Examiner*—Sung Pak
*Assistant Examiner*—Hoang Tran
(74) *Attorney, Agent, or Firm*—Fish & Associates, PC

(57) ABSTRACT

The inventive subject matter is directed toward a stationery item having bundles of fiber optics that extend through an outside surface of the stationery item in order that points at the terminating points of the fibers can be viewed. These points can be arranged to coincide with a printed object on the outside surface of the stationery item.

10 Claims, 2 Drawing Sheets

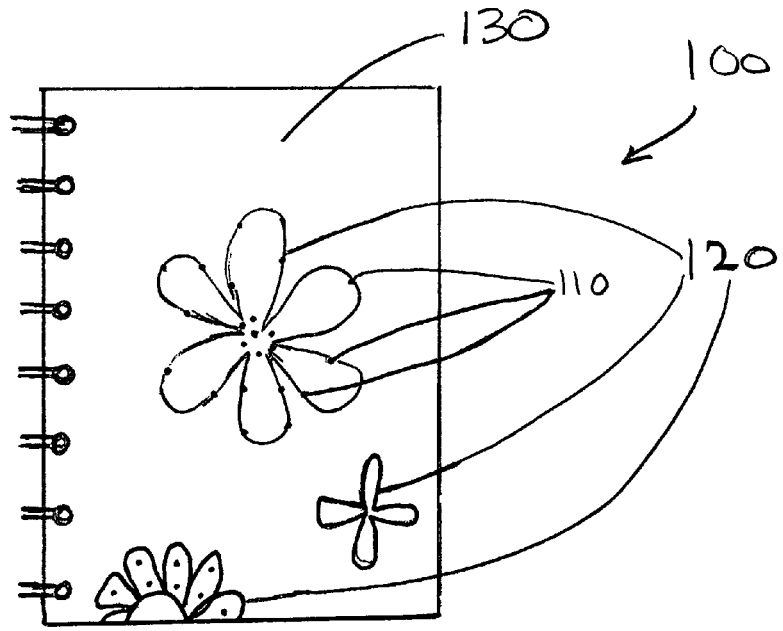
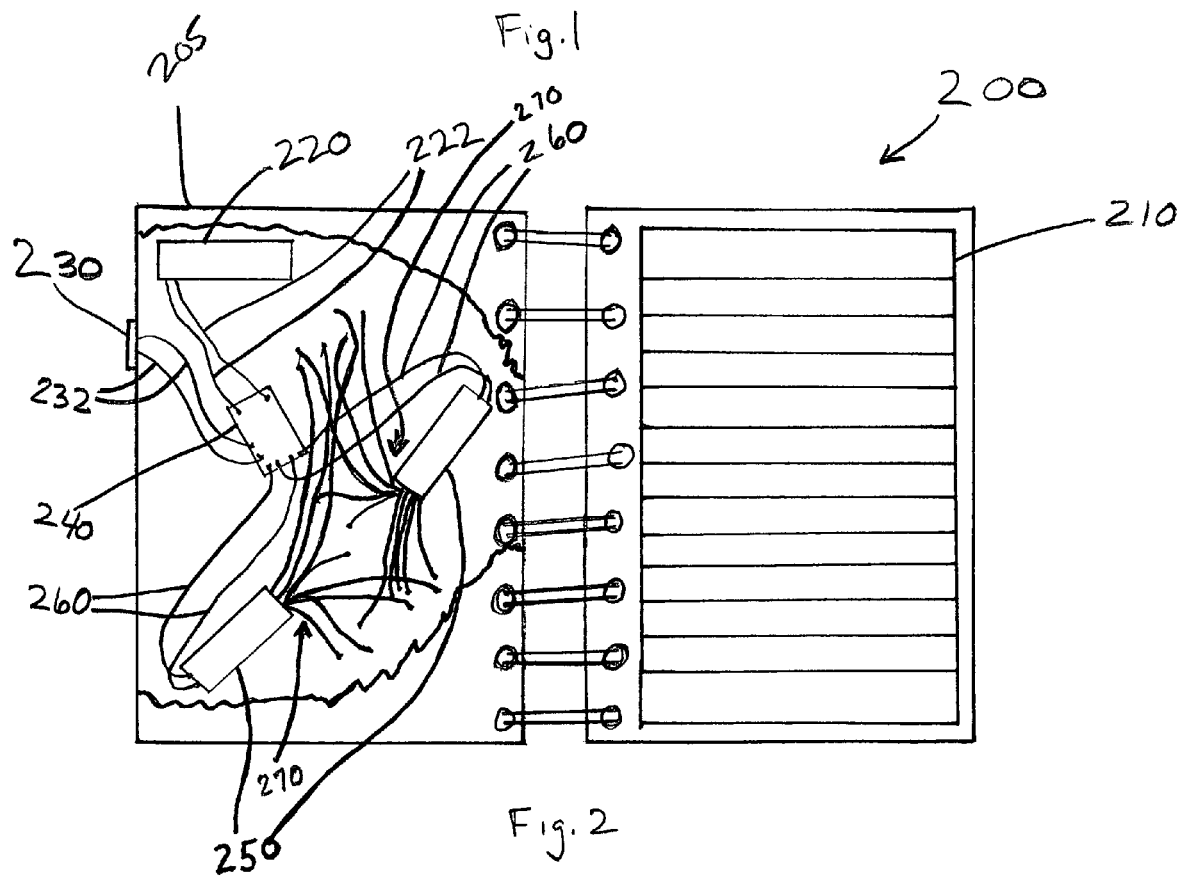

STATIONERY PRODUCTS INCORPORATING FIBER OPTICS

This application claims the benefit of U.S. provisional application No. 60/534174 filed on Dec. 31, 2003 incorporated herein by reference in its entirety.

FIELD OF THE INVENTION

The field of the invention is stationery products.

BACKGROUND OF THE INVENTION

It is known to use a light in conjunction with a note pad holder to indicate a condition. U.S. Pat. No. 6,361,075 to Ritter et al. issued in Mar. 2002 describes a note pad that has a reminder alarm in the form of a light that can be seen when the note pad is closed. Similarly, U.S. patent application Ser. No. 2002/0145280 to Bock published in Oct. 2002 teaches a folder or clipboard that has a series of lights that can be used as "interoffice alerts". Thus, the functionality of lights to alert users of an upcoming deadline is well know.

It is also known to design clothing with lights including those that use optical fibers. U.S. Pat. No. 6,302,570 to Petell et al. issued in Oct. 2001, for instance, teaches a hat that has a series of optical fibers that are used to decorate the front of the hat.

Up to now, optical fibers have not been used in conjunction with stationery items to provide an aesthetic aspect to the stationery item.

SUMMARY OF THE INVENTION

The present invention provides a stationery item having at least two bundles of optical fibers that extend through an outside surface of the stationery item. Points at the end of each fiber can be illuminated upon actuation of a mechanism that sends power to the light source.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWING

FIG. 1 is a schematic of a journal having fiber optics.

FIG. 2 is a schematic of an alternative journal with a cut away portion to show components of a fiber optic system.

DETAILED DESCRIPTION

Figure 3:
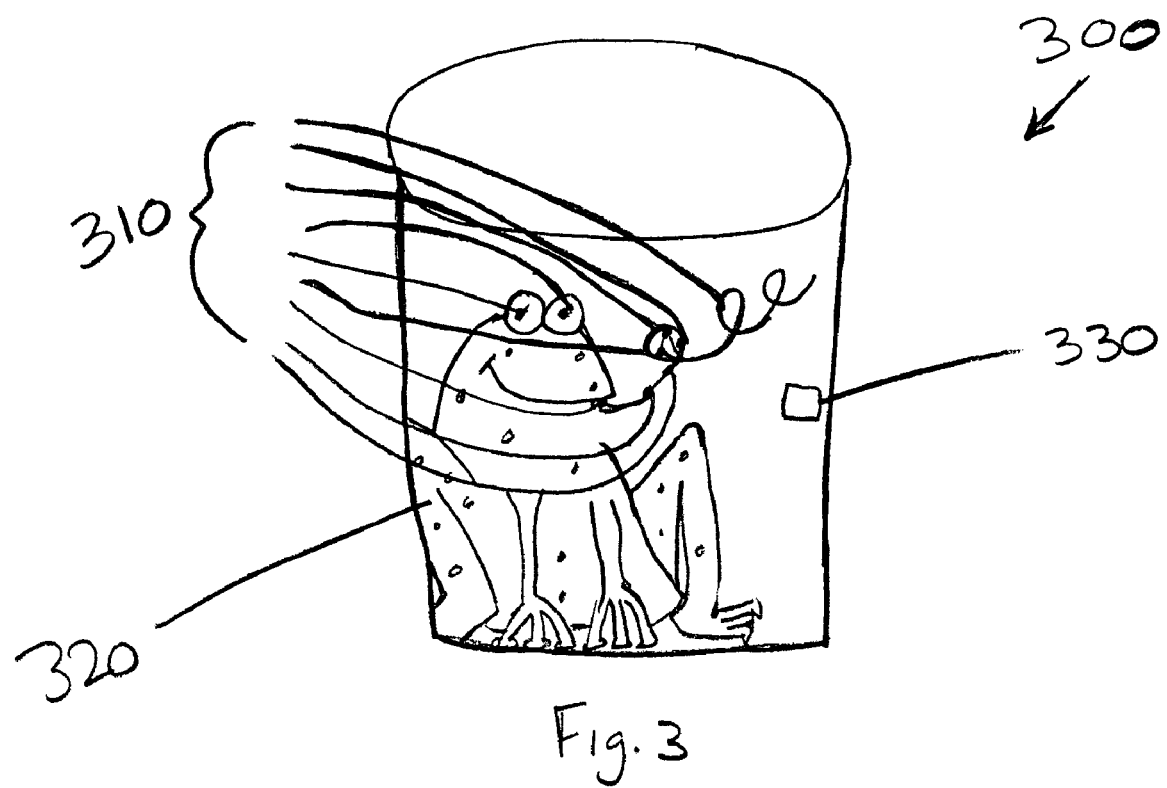
FIG. 3 is a schematic of a pencil holder having fiber optics.

Referring first to FIG. 1, a journal 100 comprises fiber optic points (i.e. ends) and a plurality of printed objects 120. Three exemplary fiber optic points are identified by numeral 110.

Fiber optic points 110 are the ends of optical fibers. Each point is less than 1 mm in height as measured from the outside surface 130 of the journal 100. Each point is the end of an individual optical fiber (not shown), the fiber being a thin (approximately 1 mm or less) strand of substantially pure glass or plastic capable of transmitting light signals. Each fiber optic point 110 is illuminated with visible light from a light source (not shown). It is contemplated that points of the fibers follow an outline printed on the outside surface of the stationery item as can be seen from observing FIG. 1. Additionally points can be randomly placed on the outside surface without regard to the location of printed objects.

FIG. 1 shows approximately 22 points although a stationery item can have many more or less points. In viewing the outside surface of a stationery item, there can be as few as two points although there may be additional points that do not extend through the outside surface.

"Stationery item" means an item traditionally sold at a stationery store. Stationery items can include: items that are written on (e.g. journals, diaries, notepads, binders, and so on); items that are used for writing or marking (e.g. pens, markers, paint brushes, pencils, stampers, and so on.); items that hold or protect stationery and electronic items (e.g. pencil holder, calculator case, PDA case, CD holder, and so on); and other items such as a lunch box, a refrigerator magnet, and a jewelry kit. "Stationery item" does not include a backpack, a hat, and other items made predominantly from fabric.

Referring now to FIG. 2, an alternative journal or notebook 200 generally comprises a power source 220, an actuating mechanism 230, a printed circuit board (PCB) 240, optical fiber bundles 270, and light emitting diodes (LEDs) 250.

Front cover 205 is approximately 1 cm thick in order to house the component parts listed above. It is contemplated, however, that the front cover could have a thickness of as little as 0.25 cm. yet still house the components. Additionally or alternatively, the components could be housed in the back cover of the journal. In a less preferred class of embodiments, some components could be housed in the front cover and others in the back cover. For other types of stationary items, the component parts need only be stored somewhere that is not easily accessible since the fiber optics are somewhat frail and capable of being dislodged from the outside surface of the item. It is preferred, however, that the power source be accessible in the case that batteries need to be replaced.

Power source 205 provides power to the LEDs 250. Such power is provided on demand as a function of actuation of the actuating mechanism 230. Power source 205 can consist of a battery or a plurality of batteries. In addition, other types of power sources are contemplated including most especially solar power sources. Power source 205 is communicatively coupled by wires 222 to PCB 240. In addition, actuating mechanism 230 is also communicatively coupled to PCB 240 by wires 232. PCB 240 has conductive traces (not shown) that are also used to accomplish the functionality of the PCB. The PCB preferably controls power to the LEDs as a result of depression of an actuating mechanism. The PCB can also comprise a time delay mechanism that may delay or cause intermittent application of power (i.e. causing blinking lights).

PCB 240 is also communicatively coupled to LEDs 250 by wires 260. The LEDs are preferred to emit visible light having unique colors from each other. These colors are generally a function of the semiconductor material used in the LED. Thus, one LEDs may emit a light wave in the red color frequency that causes points to be illuminated with red light while another may emit light waves with a blue color frequency causing points to be illuminated with a blue light. One or more bundle of fibers is coupled to each LED. Optionally, the light signals emitted from an LED can be directed through a filter that filters out some wavelengths and lets others through in order to change the color of the light. Of course, additional LEDs can be provided including a bi-colored LED as described in U.S. Pat. No. 5,408,060, incorporated herein by reference. It should be understood by one of skill in the art that other types of light sources can be substituted for an LED (e.g. an incandescent bulb), however these are less preferable.

As power is supplied to the LEDs, light waves are transmitted through the optical fibers denoted by numeral 270. Light signals travel through the fiber optics by being reflected within the inner core of the fiber. It should be noted that optical fibers 270 extend from the LEDs 250 into and through cover 205 and accordingly cover 205 is pre-configured with holes that accept the fibers. Preferably fibers will be terminated substantially flush (i.e. within 2 mm) with the outside surface 130 of the stationery item.

A bundle of fiber optics is more than one fiber. That is, the inventive subject matter contemplates that there will be a plurality of fibers that preferably display different color lights. Typically, the fibers are fed through holes in the stationery item in order to produce a desired pattern which coincides with an object on the outside surface of the item. Holes are preferably pre-drilled, molded, or punched through a surface of the item and the fibers are typically fed through and bonded into place in a manufacturing facility. However, in another class of embodiments, arrangement of the fibers and even configuring of the holes can be done by a user of the item. Not only can a user decide upon the location of the fibers, but he can also decide on which colors to use. Expanding on that concept, it is contemplated that LEDs and filters used in conjunction with LEDs can be readily removed and replaced by a user with no special tools or skills.

FIG. 3 depicts an alternative stationery item—a pencil holder 300. The pencil holder 300 has an outline 320 (a frog) printed on the outside surface 330 of the stationery item 300. It can also be observed that there are a plurality of points 310 which are formed at the termination of individual fibers. It is envisaged that the components of the fiber optic system (e.g. power source, light source, fibers. actuator, and so on) can be located in a housing in the bottom of the item.

Here, the actuating mechanism is comprised of a motion sensor 330 that is programmed to initiate power to the light source upon detecting motion. One of skill in the art will recognize that alternative types of sensors can be substituted for the motion sensor, such as for example, a light sensor.

The inventive subject matter also includes methods of providing light to the outside of a stationery item by providing components of fiber optic systems and inserting the fibers through the outside surface of the stationery item. As noted above, the step of inserting as well as additional steps of designing, arranging, and bonding can be performed by a user of the stationery item or other person that is not involved in producing the stationery item.

Thus, specific embodiments and applications of stationery products incorporating fiber optics have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A stationery item, comprising:
   a cover having an aperture;
   at least two bundles of optical fibers communicatively coupled to a light source wherein at least one optical fiber from a bundle extends from the light source and terminates at a distal end point;
   wherein the distal end point of the optical fiber at least partially extends through the aperture of the stationery item;
   wherein the distal end point has an diameter of approximately 1 mm or less;
   wherein the aperture has an diameter of approximately 1 mm or less; and
   an actuating mechanism that causes power to be supplied to the light source thereby illuminating the points.

2. The stationery item of claim 1, wherein the light source comprises at least two different colored light emitting diodes (LEDs), each LED being coupled to a separate bundle.

3. The stationery item of claim 1, wherein light waves from the light source pass through at least two different colored filters.

4. The stationery item of claim 1, wherein the cover is a portion of a journal cover.

5. The stationery item of claim 1, wherein the cover is a portion of a pencil holder.

6. The stationery item of claim 1, wherein the cover is a portion of a writing instrument.

7. The stationery item of claim 1, wherein the actuating mechanism comprises a timing mechanism.

8. The stationery item of claim 1, wherein the actuating mechanism comprises a motion sensor.

9. The stationery item of claim 1, wherein each fiber is terminated substantially flash with the outside surface of the stationery item.

10. The stationery item of claim 1, wherein the points of the fibers follow an outline printed on the outside surface of the stationery item.

* * * * *